May 8, 1934. E. BÖTTGER ET AL 1,958,380
MACHINE FOR MAKING LOLLIPOPS
Filed July 30, 1932 3 Sheets-Sheet 2

Ernst Bottger,
Max Schertz,
Inventors.

By Horace S/ Ttall
Attorney.

May 8, 1934. E. BÖTTGER ET AL 1,958,380
MACHINE FOR MAKING LOLLIPOPS
Filed July 30, 1932   3 Sheets-Sheet 3
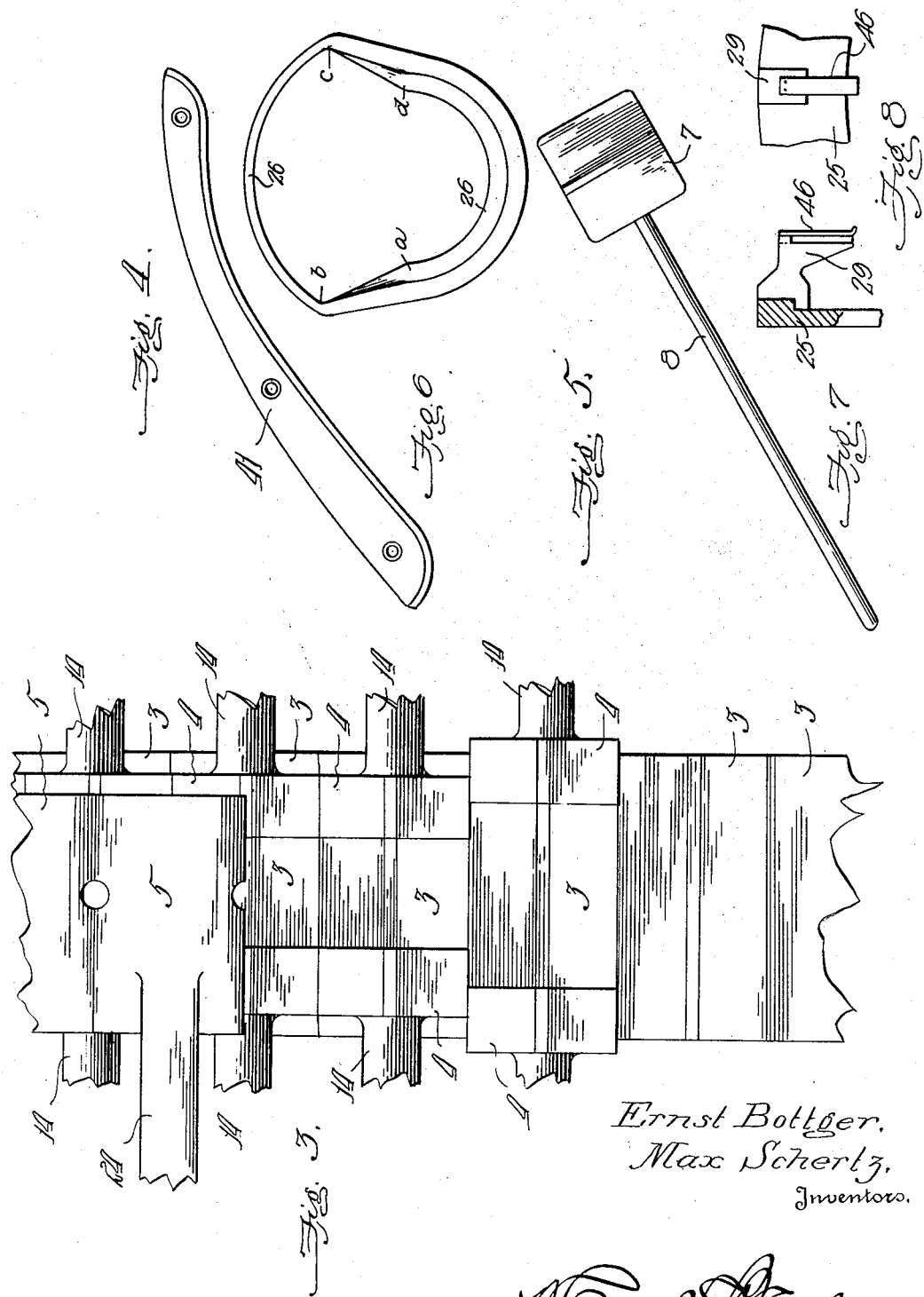
Ernst Böttger,
Max Schertz,
Inventors.
By Conrad Neall
Attorney Patented May 8, 1934

UNITED STATES PATENT OFFICE 1,958,380

MACHINE FOR MAKING LOLLIPOPS

Ernst Böttger, Dresden-Dolzschen, and Max Schertz, Dresden, Germany, assignors to The V. O. Hermann Corporation, New York, N. Y.

Application July 30, 1932, Serial No. 627,064

8 Claims. (Cl. 107—8)

Our invention relates to that particular type of machines for making candy confection in which a lump of candy or other confection is impaled on the end of a stick used as a handle in consuming the confection.

In machines of this character the lump of candy is molded between suitable dies, as for instance revolving cylinders, and the purpose of our invention is to provide means by which the stick is inserted in the lump of confection during the operation of molding the candy or confection; in the present instance the assembling being accomplished during a continuous rotation of the cylinders, employing for the purpose an endless belt serving as the device for pushing the stick into the candy.

Our invention is shown in the accompanying drawings, and the construction and operation will be fully understood from the following description.

In the accompanying drawings, the several figures show the general application of our invention, and it is upon these drawings that we base our claims for patent protection.

Fig. 3 is an enlarged detail view showing the mold sections and openings or grooves between the swinging mold sections to receive the stick.

Fig. 4 is a detail view illustrating a modification of our invention,

Fig. 5 is a view of the article produced by the machine.

Fig. 6 is a detail view of the cam for operating the swinging mold section,

Fig. 7 is a side elevation of the stick holder, and Fig. 8 is a front elevation thereof.

Figure 1:
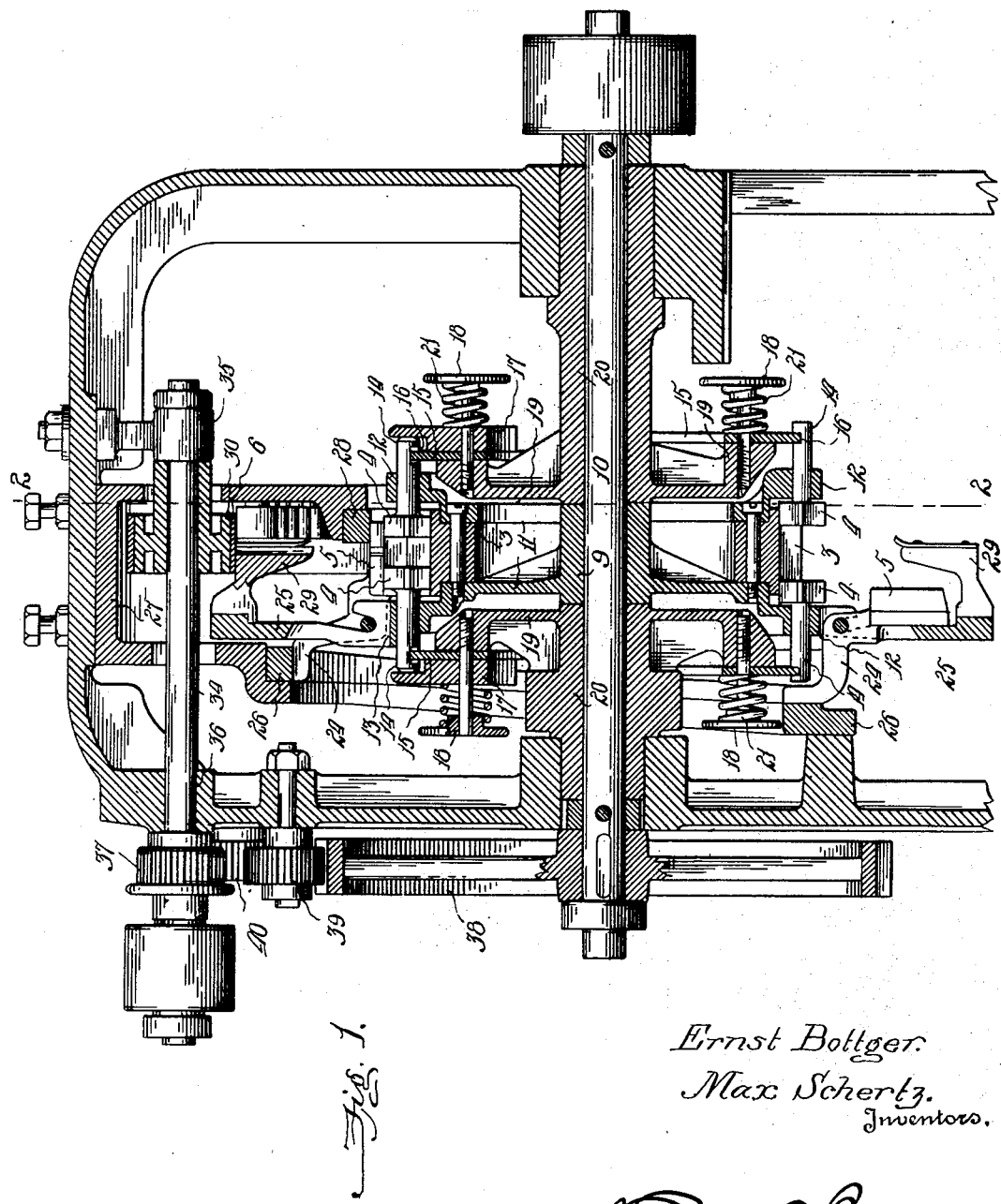
Figure 1 is a transverse vertical sectional view through a lollipop machine, showing the application of our improved means for inserting the stick.

In the said drawings we have shown so much of a well known machine for making lollipops as to illustrate the application of our invention; that is to say, the several mold sections of an ordinary type between which the lump of confection or candy is molded are designated by the numerals 3, 4, and 5, and in carrying out our invention the endless belt or pusher device by which the sticks are forced into the candy during the molding of the same is designated generally by the numeral 6, while 7 designates the lump of candy or confection and 8 the stick (see Fig. 5). It will be noted that the confection in a plastic state is introduced between the mold sections, which latter combine to form cavities of the required shape to give the desired form to the lump of confection, and that the stick is fed into registering grooves between the mold sections 5, 5 so as to project for operation of the pusher device.

As hereinbefore stated our invention relates more particularly to the means for inserting the stick in that type of lollipop machine in which the lump of candy is formed by a rotating cylinder or cylinders, and in the present instance the sticks are pushed into the lump of confection preferably by means of a belt disposed tangentially, whereby the revolving motion of the cylinder, or holders hereinafter described carried thereby, from which the sticks project will cause the sticks to be gradually inserted.

For the purpose of showing the general application of our invention we have illustrated that well known type of candy forming machine comprising a revolving cylinder 9 keyed to a shaft 10 and having opposite heads 11, 11 between which the fixed mold sections 3 are bolted, said heads being provided with peripheral flanges 12 and 13 between which the laterally movable mold sections 4, 4 are slidable by means of rods or stems 14 formed integrally therewith and extending through bearings therefor in the flanges. These slidable mold sections which cooperate with the fixed mold sections are operated by stationary cam discs 15 engaging recesses 16 in the rods and cooperating with cam plates 17 with which the ends of the rods engage, said cams being secured by bolts 18 to stationary discs 19, 19 located at opposite sides of the cylinder and having hubs 20, 20 by which they are mounted on the shaft 10. In order that the cams 15 and 17 may yieldingly engage the rods of the laterally movable mold sections the bolts 18 are extended beyond said cams to receive interposed springs 21, and by reference to Fig. 1 of the drawings it will be noted that these cams operate the laterally movable mold sections 4, 4 so that they will cooperate with the mold sections 3 and 5 to provide the cavity in which the confection is molded (see the upper part of the cylinder 9) and open said laterally movable mold sections in discharging the confection (see the lower part of said cylinder), the confection being introduced into the mold cavities successively from a common form of mixing and feeding machine (not shown) through the tube 22 (Fig. 2) and discharged by way of the trough 23. When the mold sections 4, 4 are moved to form the lump of confection mold section 5 is swung down upon the same, and so that the lump of confection may be discharged from between the laterally movable mold sections mold section 5 swings away from the same. For this operation of the mold sections 5 they are carried at one end of bell crank levers 24 fulcrumed in an extension 25 of the flange 13 of the revolving cylinder 9, and the other end of each bell crank lever engages a circular cam 26 (see Fig. 6) secured to the frame of the machine, at its upper end by an inverted U-shaped bracket 27 which serves also to support an arcuate pressure foot 28 adapted to bear upon the outer end of mold section 5 after intimate engagement thereof with the other mold sections.

Figure 2:
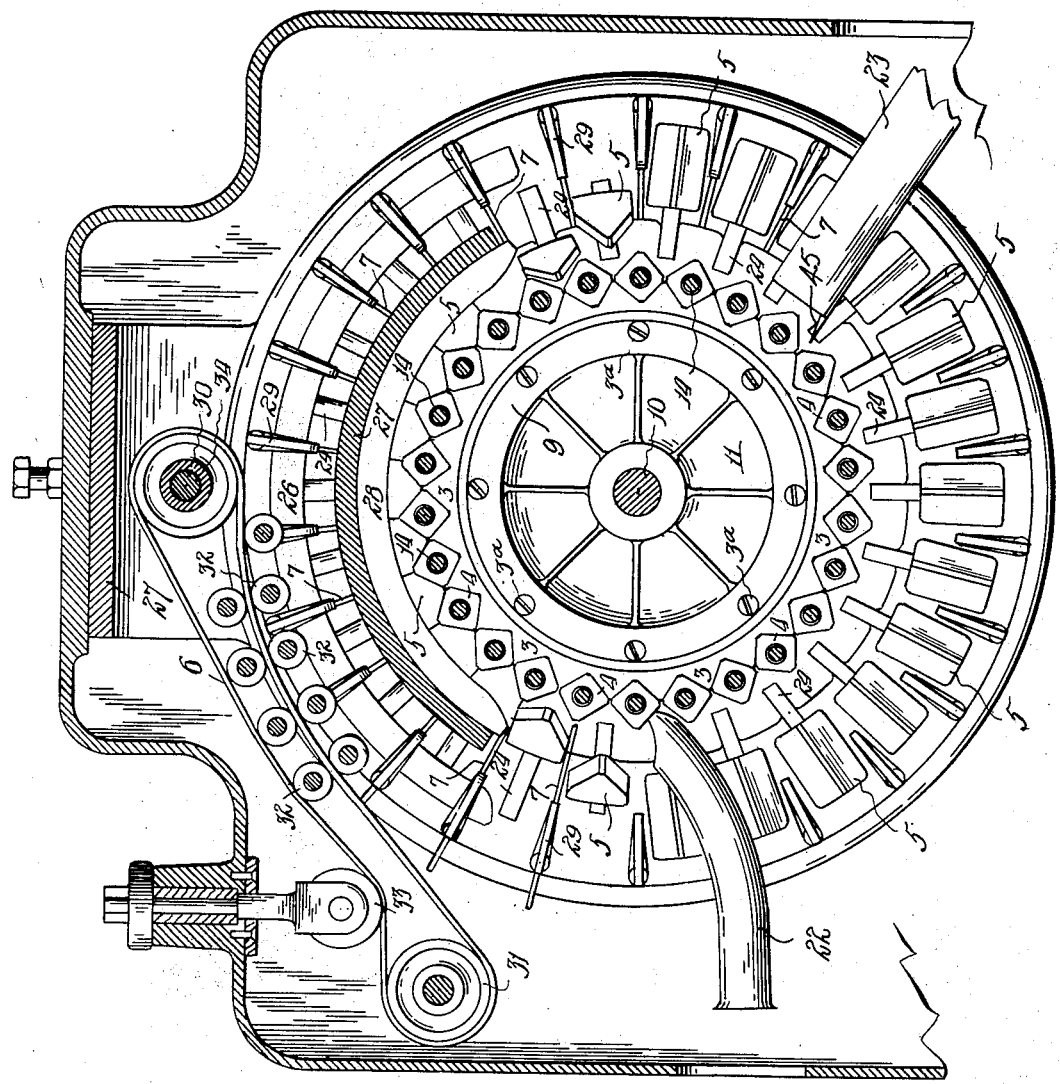
Figure 2 is a sectional view on the line 2—2 of Fig. 1.

By reference to the detail view of the cam shown in Fig. 6 it will be noted that as the cylinder revolves the bell crank lever is operated by said cam to swing the movable mold section 5 downwardly, as shown in Figs. 1 and 2, and as this mold section arrives at the point *a* on the cam the bell crank lever is swung as it travels from *a* to *b* from whence it is in the lowered position and remains in this position until it arrives at the point *c* on the cam when it is again swung outwardly by that part of the cam extending from *c* to *d*.

For temporarily holding the sticks on a line with the mold cavities we provide holding devices 29 into which the sticks are fed from a hopper (not shown) and from which the outer ends of said sticks project as shown in Fig. 2 to be pushed into the confection preferably by means of the belt 6 disposed tangentially at and beyond the outer ends of the stick holding devices. This belt is supported at opposite ends thereof by pulleys 30 and 31, with idle rollers 32 directing the lower stretch and idle roller 33 for keeping the belt taut. The belt is driven by a shaft 34 supported in a hanger 35 at one end and in a bearing 36 at one side of the frame of the machine and beyond which latter it projects to receive a driving pinion 37 geared to a large gearwheel 38 on shaft 10 by intermediate pinions 39 and 40. It will be understood, however, that instead of the belt we may employ a plate 41 as shown in Fig. 4 of the drawings, it being understood that the purpose of the belt or plate is to gradually push the sticks into the lump of confection formed by the mold sections as the cylinder carrying said mold sections is revolved.

By reference to Figs. 7 and 8 it will be noted that the stick is passed into the outer end of the holder 29 so as to be held by a spring 46 bearing against the stick, the upper end of which latter extends through a hole in the upper end of the holder, and that when the mold section 5 is swung outwardly as shown to the right in Fig. 2 blade 45 of the discharge spout 23 passes between the slidable mold sections 4, 4 to eject the lump of candy, when the stick is then pulled out of the holder as the cylinder revolves.

We claim:

1. In a machine for making lollipops, the combination with a rotatable cylinder having dies for shaping the candy and means for supporting the sticks radially on a line with said dies at one side thereof, of means for assembling the candy and sticks comprising an element disposed tangentially with respect to the rotatable cylinder to engage the outer ends of the sticks for pushing them into the candy.

2. In a machine for making lollipops, the combination with a rotatable cylinder having dies for shaping the candy and means for supporting the sticks radially on a line with said dies at one side thereof, the outer ends of the sticks projecting beyond the periphery of the cylinder, of means for pushing the sticks into the candy comprising an endless belt disposed tangentially at the periphery of the cylinder to engage the outer ends of the sticks for pushing them gradually into the candy on rotation of the cylinder.

3. In a machine for making lollipops, the combination with a rotatable cylinder having dies for shaping the candy and means for supporting the sticks radially on a line with said dies at one side thereof, of means for pushing the sticks into the candy comprising an endless belt disposed tangentially to engage the outer ends of the sticks for pushing them gradually into the candy on rotation of the cylinder, and means for synchronizing the movement of the operating stretch of the belt with the movement of the cylinder carrying the sticks.

4. In a machine for making lollipops, the combination with a rotatable cylinder having dies for shaping the candy and means for supporting the sticks radially on a line with said dies at one side thereof, of means for pushing the sticks into the candy comprising an endless belt disposed tangentially to engage the outer ends of the sticks for pushing them gradually into the candy on rotation of the cylinder, means for synchronizing the movement of the operating stretch of the belt with the movement of the cylinder carrying the sticks, and means for guiding the operating stretch of the belt.

5. In a machine for making lollipops, the combination with a rotatable cylinder having dies for shaping the candy and means for supporting the sticks radially on a line with said dies at one side thereof, of means for pushing the sticks into the candy comprising an endless belt disposed tangentially to engage the outer ends of the sticks for pushing them gradually into the candy on rotation of the cylinder, means for synchronizing the movement of the operating stretch of the belt with the movement of the cylinder carrying the sticks, and rollers over which the operating stretch of the belt passes for guiding the belt in its engagement with the sticks.

6. In a machine for making lollipops, the combination with a rotatable cylinder having dies for shaping the candy and means for supporting the sticks radially on a line with said dies at one side thereof, the outer ends of the sticks projecting beyond the periphery of the cylinder, of means for pushing the sticks into the candy comprising rollers supported in the frame of the machine beyond the periphery of the cylinder, an endless belt passing over the rollers with the inner stretch thereof extending tangentially with respect to the periphery of the cylinder, idle rollers engaging the inner stretch of the belt for guiding the same with respect to the projecting ends of the sticks, and gearing between the shaft of the cylinder and endless belt for synchronizing the movement of the belt with the movement of the cylinder or ends of the sticks engaged by the belt.

7. In a machine for making lollipops, the combination with a cylinder having dies for shaping the candy, of a pivoted lever carrying one of the die members at one end thereof, a cam engaging the other end of the lever for operating the same, means for supporting a stick on a line with said die at one side thereof, and an element disposed tangentially with respect to the rotation of the cylinder and movement of the outer ends of the sticks for pushing the latter into the candy.

8. In a machine for making lollipops, the combination with a cylinder having dies for shaping the candy, of a pivoted lever carrying one of the die members at one end thereof, a cam engaging the other end of the lever for operating the same, means for supporting a stick on a line with said die at one side thereof, a belt disposed tangentially with respect to the rotation of the cylinder and movement of the outer ends of the sticks for pushing the latter into the candy, and a train of gearing driven from the shaft of the cylinder for synchronizing the movement of the belt with the movement of the cylinder or outer ends of the sticks.

ERNST BÖTTGER.
MAX SCHERTZ.